UNITED STATES PATENT OFFICE.

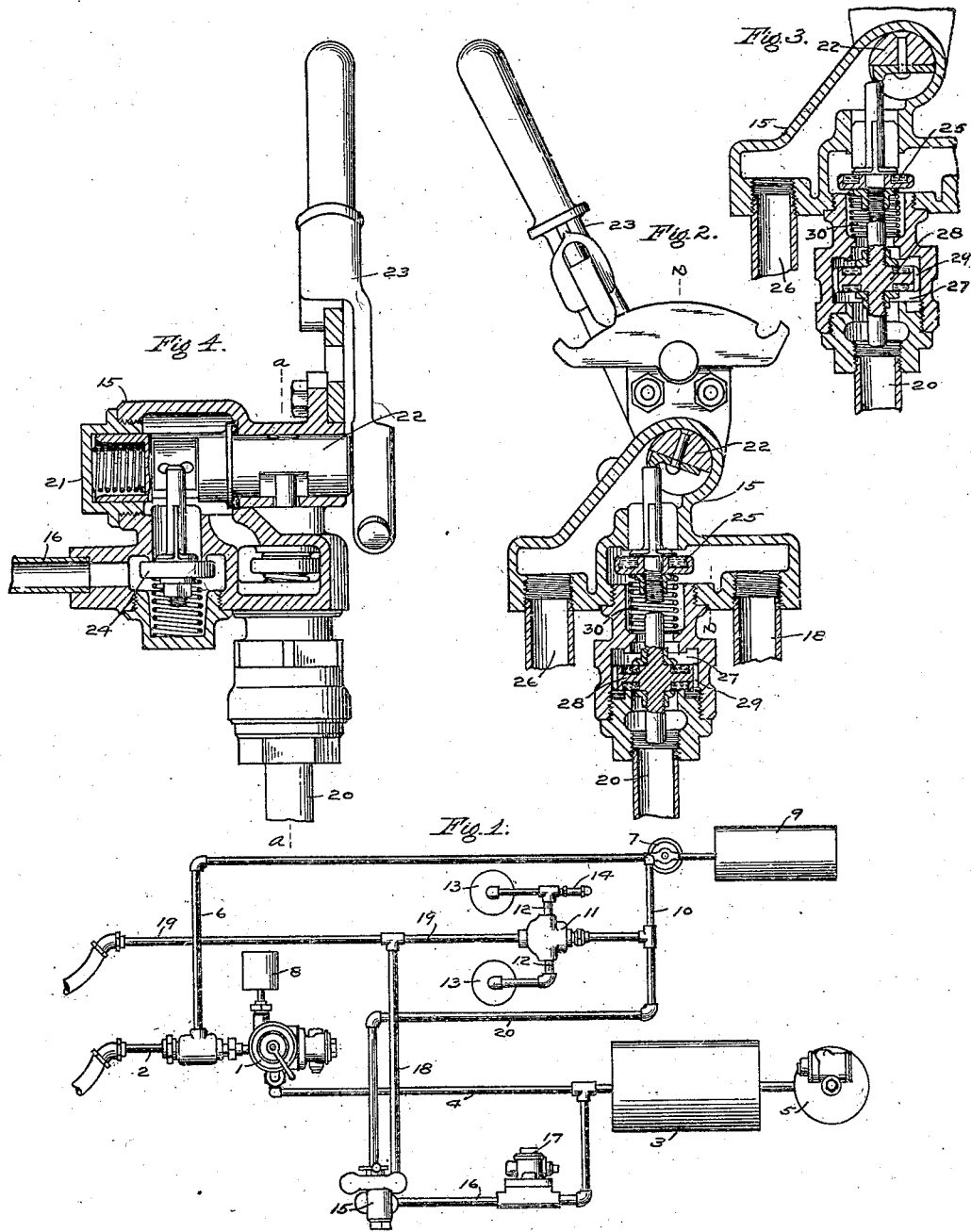

WALTER V. TURNER, OF EDGEWOOD, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

COMBINED AUTOMATIC AND STRAIGHT AIR-BRAKE.

956,234.        Specification of Letters Patent.        Patented Apr. 26, 1910.

Application filed July 1, 1907. Serial No. 381,775.

*To all whom it may concern:*

Be it known that I, WALTER V. TURNER, a citizen of the United States, residing at Edgewood, in the county of Allegheny and State of Pennsylvania, have invented new and useful Improvements in Combined Automatic and Straight Air-Brakes, of which the following is a specification.

This invention relates to fluid pressure brakes, and more particularly to a combined automatic and straight air brake equipment as applied to locomotives.

The present standard apparatus comprises in addition to the usual main reservoir, engineer's brake valve, train pipe, triple valve, auxiliary reservoir and brake cylinder of the automatic system, a straight air brake valve and pipe leading to a double check valve located between the triple valve and the brake cylinders, the check valve being adapted to engage one seat for closing communication from the straight air brake valve and for opening communication from the triple valve to the brake cylinders when the brakes are applied by the engineer's brake valve of the automatic system, and to move to its opposite seat for closing communication from the triple valve and for opening communication from the straight air brake valve to the brake cylinder, when the engine brake is applied with straight air by by the straight air brake valve. With this standard apparatus, as shown in the several Westinghouse instruction pamphlets relating to the combined automatic and straight air locomotive brake equipment, issued respectively in the years 1903, 1905 and 1907, in order to release the engine brakes and hold the automatic train brakes applied, an independent release pipe is connected to the pipe leading from the triple valve to one side of the double check valve, so that, on opening the cock, fluid may be released from the engine brake cylinders through the double check valve and the release pipe.

The principal object of my invention is to provide improved means, controlled by the straight air brake valve, for effecting the release of the engine brakes, while holding the train brakes applied.

In the accompanying drawings; Figure 1 is a diagrammatic view showing a standard combined automatic and straight air brake equipment as applied to a locomotive; Fig. 2 a sectional view of a straight air brake valve, with my improvements applied, on line *a—a* of Fig. 4, showing the parts in normal running position; Fig. 3 a similar view, showing the parts in position to release the locomotive brakes independently of the train brakes, and Fig. 4 a sectional view on line *b—b* of Fig. 2, showing the parts, as in Fig. 2, in running position.

According to Fig. 1, the standard combined automatic and straight air brake equipment on the engine comprises the engineer's brake valve 1, equalizing reservoir 8, train pipe 2, main reservoir 3, main reservoir pipe 4, air pump 5, branch pipe 6 leading to the triple valve 7, auxiliary reservoir 9, pipe 10 leading from triple valve 7 to double check valve 11, pipes 12 leading from check valve 11 to brake cylinder 13, and having a safety valve 14, straight air brake valve 15, connected by pipe 16, through reducing valve 17 to the main reservoir 3, and by pipe 18 to straight air pipe 19, connected through the double check valve 11 to the brake cylinders on the engine and also leading to the double check valve on the tender. In addition to the above standard Westinghouse equipment, a release pipe 20 is connected to pipe 10, and leads to the straight air brake valve 15.

The straight air brake valve comprises a casing 21, containing a rocker shaft 22, adapted, by manipulation of the handle 23, to operate the straight air application valve 24, controlling communication between the main reservoir pipe 16 and pipe 18 leading to pipe 19 and the engine brake cylinders, and to operate the release valve 25, controlling communication between the exhaust port 26 and pipe 18.

According to a preferred form of my invention, the straight air brake valve 15 may be provided with a valve chamber 27 containing a double seated valve 28 for controlling communication through the release pipe 20 leading to the triple valve side of the double check valve 11. The location of this valve 28 is such that it may be actuated by the continued opening movement of the release valve 25, though it will be understood, that the release valve 28 may be in a separate casing, and operated by the movement of the straight air brake handle in any suitable manner.

When an automatic application of the brakes is made by the engineer's brake valve, fluid under pressure flows to the pipe 10, and shifts the double check valve in the usual way, to admit fluid to the brake cylinder 13, and fluid also flows into the pipe 20 to the valve 28, so that the valve 28 is then shifted to its upper seat, closing communication through the pipe 20, so that no fluid escapes. A straight air application may be made in the usual way, by moving the handle 23 to application position, opening the application valve 24, so that fluid from pipe 16 and the main reservoir flows to the brake cylinder through pipe 18, shifting the double check valve. In this case, the fluid pressure in the pipe 18, and on the upper face of the double seated valve 28 moves the same to its lower seat, so that air will not escape to the pipe 20 and the triple valve exhaust port.

If the brakes are applied automatically, and it is desired to release the engine brakes, and hold the train brakes applied, the straight air brake valve handle is moved to an additional position provided by extending the notch for the normal running position, as shown in Fig. 2.

In the engine brake release position, as shown in Fig. 3, the release valve 25 is opened, and the continued downward movement thereof also shifts the double seated valve 28 to a position intermediate the opposite seats. Passages 29 through said valve 28 will now open communication from pipe 20 to the exhaust port 26, around the release valve 25, and fluid in pipe 20 and on the triple valve face of the double check valve 11 will be vented to the atmosphere. The double check valve being seated toward the straight air pipe 19, fluid from the brake cylinders will be released through pipe 20, so long as the handle 23 is in its extreme release position.

In order to insure that the valve 28 will seat when an automatic application is made, it is preferable to provide means for automatically returning the brake valve handle and the release valve to normal running position, so that the valve 28 is permitted to close. For this purpose, the spring 30 acting on the release valve 25 may be made strong enough to shift the valve and handle, or a separate spring device may be applied to the handle 23 itself, as will be apparent.

It will now be apparent that my invention provides a simple construction which may be applied to the standard combined automatic and straight air brake apparatus without material alteration therein, and wherein the engine brakes may be readily released while holding the train brakes applied.

Having now described my invention, what I claim as new and desire to secure by Letters Patent is:—

1. In a combined automatic and straight air brake apparatus, the combination with an engineer's brake valve, train pipe, triple valve, auxiliary reservoir, brake cylinder, and double check valve, of a straight air brake valve and a release pipe connected to the triple valve side of said double check valve, and controlled by said straight air brake valve.

2. In a combined automatic and straight air brake apparatus, the combination with an engineer's brake valve, train pipe, triple valve, auxiliary reservoir, brake cylinder, and double check valve, of a straight air brake valve, adapted to control the release of fluid under pressure from the triple valve side of said double check valve.

3. In a combined automatic and straight air brake apparatus, the combination with an engineer's brake valve, train pipe, triple valve, auxiliary reservoir, brake cylinder, and double check valve, of a straight air brake valve, a release pipe connected to the triple valve side of said double check valve, and a valve, operated by the movement of the straight air brake handle, for controlling communication through said release pipe.

4. In a combined automatic and straight air brake apparatus, the combination with an engineer's brake valve, train pipe, triple valve, auxiliary reservoir, brake cylinder, and double check valve, of a straight air brake valve, a release pipe connected to the triple valve side of said double check valve, and a valve, operated by the movement of the straight air brake handle, for opening and closing communication through said release pipe to the atmosphere.

5. In a combined automatic and straight air brake apparatus, the combination with an engineer's brake valve, train pipe, triple valve, auxiliary reservoir, brake cylinder, and double check valve, of a straight air brake valve, comprising an application and a release valve, a release pipe connected to the triple valve side of said double check valve, and a valve, operated by the movement of said release valve for opening and closing communication through said release pipe.

6. In a combined automatic and straight air brake apparatus, the combination with an engineer's brake valve, train pipe, triple valve, auxiliary reservoir, brake cylinder, and double check valve, of a straight air brake valve, a release pipe connected to the triple valve side of said double check valve, and a double seated valve, subject to opposing pressures of the triple valve and straight air sides of said double check valve, and operated by the movement of said straight air brake valve for opening and closing communication through said release pipe.

7. In a combined automatic and straight air brake apparatus, the combination with an engineer's brake valve, train pipe, triple valve, auxiliary reservoir, brake cylinder, and double check valve, of a straight air brake valve, comprising an application and a release valve, for controlling the supply to and release of fluid from the straight air side of said double check valve and the brake cylinder, and a valve, operated by said straight air brake valve, for releasing fluid from the triple valve side of said double check valve and said brake cylinder.

8. In a combined automatic and straight air brake apparatus, the combination with an engineer's brake valve, train pipe, triple valve, and brake cylinder, of a straight air brake valve, a double check valve for controlling communication from the triple valve and the straight air brake valve to the brake cylinder, and a release pipe connected to the triple valve side of the double check valve and controlled by the straight air brake valve.

9. In a fluid pressure brake, the combination with a train pipe, triple valve, brake cylinder, and engineer's brake valve, of a straight air brake valve, a double check valve for controlling communication from the triple valve and straight air brake valve to the brake cylinder, and means operated by the straight air brake valve for controlling the release of air from the triple valve side of the double check valve.

In testimony whereof I have hereunto set my hand.

WALTER V. TURNER.

Witnesses:
R. F. EMERY,
WM. M. CADY.